(12) United States Patent
Sugimoto et al.

(10) Patent No.: US 6,335,095 B1
(45) Date of Patent: *Jan. 1, 2002

(54) POWDERY THERMOPLASTIC ELASTOMER COMPOSITION AND ARTICLES OBTAINED BY MOLDING SAME

(75) Inventors: Hiroyuki Sugimoto; Yoshihiro Nakatsuji, both of Chiba (JP)

(73) Assignee: Sumitomo Chemical Company, Limited, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/983,044
(22) PCT Filed: May 13, 1997
(86) PCT No.: PCT/JP97/01596
  § 371 Date: Mar. 16, 1998
  § 102(e) Date: Mar. 16, 1998
(87) PCT Pub. No.: WO97/43337
  PCT Pub. Date: Nov. 20, 1997

(30) Foreign Application Priority Data

May 15, 1996 (JP) .............................. 8-120352
May 16, 1996 (JP) .............................. 8-121941

(51) Int. Cl.$^7$ .............................. C08L 21/00; C08J 3/12
(52) U.S. Cl. .................. 428/402; 525/193; 525/194; 525/211; 525/232; 525/237; 525/241; 525/934
(58) Field of Search .................. 428/402; 525/934, 525/193, 194, 211, 232, 237, 241

(56) References Cited

U.S. PATENT DOCUMENTS

| | | | |
|---|---|---|---|
| 5,041,251 A | * 8/1991 | McCloskey et al. | 264/130 |
| 5,306,779 A | * 4/1994 | Shibata et al. | 525/314 |
| 5,532,055 A | * 7/1996 | Igarashi et al. | 428/318.6 |
| 5,676,786 A | * 10/1997 | Mizuno et al. | 156/245 |
| 5,840,229 A | * 11/1998 | Sugimoto et al. | 525/934 |
| 5,977,259 A | * 11/1999 | Sugimoto et al. | 525/232 |

FOREIGN PATENT DOCUMENTS

| | | | |
|---|---|---|---|
| EP | 0712891 A1 | | 11/1995 |
| JP | A 236244 | | 2/1990 |
| JP | A 372512 | | 3/1991 |
| JP | 04-25520 | * | 1/1992 |
| JP | A 5473 | | 1/1993 |
| JP | A 6184316 | | 7/1994 |
| JP | 07-82433 | * | 3/1995 |
| JP | A 782433 | | 3/1995 |
| JP | 07-96529 | * | 4/1995 |
| JP | 07-96532 | * | 4/1995 |

OTHER PUBLICATIONS

Alger, "Polymer Science Dictionary", Champman & Hall, New York, p. 110 (1997).*
Kakugo et al., "Impact–Resistant Polyproplene", Journal of Sumitomo Chemical Co., pp22–29, 1970–1.*

* cited by examiner

Primary Examiner—Donald R. Wilson
(74) Attorney, Agent, or Firm—Birch, Stewart, Kolasch & Birch, LLP (57) ABSTRACT

A thermoplastic elastomer composition powder comprising a thermoplastic elastomer composition represented by the following (A), having a sphere-reduced average diameter of not more than 1.2 mm and a bulk specific gravity of not less than 0.38: (A) a thermoplastic elastomer composition comprising (a) 100 parts by weight of a polyolefin resin; (b) 20 to 250 parts by weight of a conjugated diene polymer of hydrogenated conjugated diene copolymer having a hydrogenation degree of not less than 70%, which is prepared by hydrogenating a conjugated diene-vinyl aromatic compound random copolymer in which the content of a vinyl aromatic compound unit is not more than 25% by weight; and (c) 0 to 500 parts by weight of an ethylene/α-olefin copolymer rubber. This powder can give a molded article having excellent appearance and flexibility, which does not cause whitening easily on bending, according to the powder molding method.

5 Claims, 2 Drawing Sheets

POWDERY THERMOPLASTIC ELASTOMER COMPOSITION AND ARTICLES OBTAINED BY MOLDING SAME

This application is the national phase under 35 U.S.C. §371 of prior PCT International Application No. PCT/JP97/01596 which has an International filing date of May 13, 1997 which designated the United States of America, the entire contents of which are hereby incorporated by reference.

FIELD OF THE INVENTION

The present invention relates to a thermoplastic elastomer composition powder, and a molded article produced by molding the same.

BACKGROUND ART

Hitherto, a sheet-like molded article having a complicated uneven decorations such as leather grain, stitch and the like, on its surface has been used as a skin material of automobile interior parts. As the molded article, there has been proposed a molded article which is obtained by powder-molding a powder prepared by grinding an olefin based thermoplastic elastomer, as a substitute of a conventional vinyl chloride molded article (see, for example, JP-A-3-199579 and JP-A-3-199589). However, the molded article which is obtained by powder-molding the powder prepared by grinding the thermoplastic elastomer, had such a problem that when a molded article having a complicated shape, for example, such as a molded article having narrow and high convex portion, is produced, appearance faults such as pinholes, wormholes and the like, arise at the edge of the convex portion. Furthermore, there also arose a problem that when the molded article is released from a mold on production of the molded article or when the molded article is preformed before the molded article is laminated on a base material, the bent portion of the molded article tends to cause whitening because whitening is liable to arise on bending, Therefore, there is desired a thermoplastic elastomer molded article capable of making use of a feature of powder molding, wherein no appearance deficiencies arise and whitening does not arise easily on bending.

DISCLOSURE OF THE INVENTION

The present inventors have intensively studied about a thermoplastic elastomer powder which gives a molded article having excellent appearance regardless of a complicated shape and not whitening easily on bending. As a result, the present inventors have found that a powder having a specific property of a thermoplastic elastomer composition comprising a polyolefin resin and a specific hydrogenated diene copolymer in a specific ratio, causes no poor appearance and gives a molded article which scarcely causes whitening. Thus, the present invention has been accomplished.

According to the first gist, the present invention provides powder of a thermoplastic elastomer composition comprising (a) 100 parts by weight of a polyolefin resin; (b) 5 to 250 parts by weight of a hydrogenated conjugated diene based copolymer; and (c) 0 to 500 parts by weight of an ethylene-α-olefin copolymer rubber, wherein a sphere-reduced average particle diameter is not more than 1.2 mm and a bulk specific gravity is not less than 0.38. The powder is used in the powder molding method, and gives a molded article which does not cause appearance deficiencies such as pinhole, wormholes and the like at the complicated shape portion such as a edge of the convex portion and scarcely causes whitening on bending.

According to the second gist of the present invention, the present invention provides a molded article produced by molding the thermoplastic elastomer composition powder described above. The molded article of the present invention does not cause appearance faults such as pinholes, wormholes and the like at the complicated shape portion and scarcely causes whitening on bending.

BEST MODE FOR CARRYING OUT THE INVENTION

The present invention will be described in detail below.

The thermoplastic elastomer composition powder of the present invention is comprising a composition comprising (a) 100 parts by weight of a polyolefin resin; (b) 5 to 250 parts by weight of a hydrogenated diene based polymer; and (c) 0 to 500 parts by weight of an ethylene/α-olefin copolymer rubber.

The above polyolefin resin (a) is at least one having a crystallizability, which is selected from a polymer or copolymer of at least one olefin. Examples of the olefin include a olefin having 2 to 8 carbon atoms such as ethylene, propylene, 1-butene, 1-hexene, 1-octene and the like. Examples of the polyolefin resin include polyethylene, polypropylene, polybutene-1 and a copolymer of propylene with the other α-olefin (e.g. 1-butene, etc.). When the polyolefin resin (a) is a propylene-ethylene copolymer or a propylene-1-butene copolymer, the thermoplastic elastomer composition of the present invention can give a molded article which is particularly superior in flexibility. It is also possible to use a copolymer produced by copolymerizing two or more monomers selected from ethylene and α-olefins having 3 to 8 carbon atoms in two or more stages. For example, it is possible to use a copolymer obtained by polymerizing propylene in the first stage and copolymerizing propylene with ethylene or α-olefin other than propylene. When a molded article is produced by using the thermoplastic elastomer composition powder of the present invention according to the powder molding method, a melt flow rate (MFR) measured at 230° C. under a load of 2.16 kgf according to JIS K-7210 of the polyolefin resin (a) is normally within the range from 20 to 500 g/10 min., preferably from 50 to 300 g/10 min., in view of the strength of the resulting molded article.

The above hydrogenated diene based polymer (b) can be obtained by hydrogenating a conjugated diene polymer or a conjugated diene-vinyl aromatic random copolymer.

The conjugated diene polymer is a polymer produced by polymerizing at least one conjugated diene. Examples of the conjugated diene include conjugated diene having 4 to 8 carbon atoms such as butadiene, isoprene, pentadiene, 2,3-dimethylbutadiene and the like.

Examples of the conjugated diene polymer include polybutadiene, polyisoprene, polypentadiene and the like.

Regarding the vinyl aromatic compound, the 1- or 2-position of a vinyl group may be substituted with a lower alkyl group such as methyl group and the like. Examples of the vinyl aromatic compound include vinyl aromatic compound having 8 to 12 carbon atoms such as styrene, p-methylstyrene, α-methylstyrene and the like.

Examples of the conjugated diene-vinyl aromatic compound random copolymer include butadiene-styrene random copolymer, isoprene-styrene random copolymer, butadiene-p-methylstyrene random copolymer and the like.

The content of the vinyl aromatic compound unit in the conjugated diene-vinyl aromatic compound random copolymer is normally not more than 25% by weight, preferably not more than 20% by weight. When the content exceeds 25% by weight, the molded article obtained by molding the thermoplastic elastomer composition powder tends to cause whitening on bending.

The conjugated diene unit of the conjugated diene polymer or conjugated diene-vinyl aromatic compound random copolymer may contain conjugated diene units having an olefinically unsaturated bond at the side chain and conjugated diene units having an olefinically unsaturated bond in the backbone chain, according to the polymerization portion of the conjugated diene. The ratio of the number of the conjugated diene units having an olefinically unsaturated bond at the side chain to those of the whole conjugated diene units is normally within the range from 5 to 95%, preferably from 30 to 95%, more preferably from 40 to 90%.

The conjugated diene polymer or conjugated diene-vinyl aromatic compound random copolymer can be produced by known method. For example, in order to produce the conjugated diene polymer, a conjugated diene may be subjected to living anion polymerization in a hydrocarbon solvent. In oder to produce the conjugated diene-vinyl aromatic compound random copolymer, a conjugated diene and a vinyl aromatic compound may be subjected to living anion polymerization (see, for example, JP-A-2-36244).

In case of the living anion polymerization, an initiator such as an organolithium compound is normally used. Examples of the organolithium compound include alkyllithiums such as n-butyllithium, sec-butyllithium, tert-butyllithium and the like.

Examples of the hydrocarbon solvent include aliphatic hydrocarbons such as hexane, heptane and the like; cyclic aliphatic hydrocarbons such as methylcyclopentane, cyclohexane and the like; aromatic aliphatic hydrocarbons such as benzene, toluene, xylene and the like; and unsaturated aliphatic hydrocarbons such as 2-methylbutene-1, 2-methylbutene-2 and the like.

The living anion polymerization may be conducted by a batch or continuous process, and the polymerization temperature is normally within the range from 0 to 120° C.

In the living anion polymerization described above, the ratio of the number of the conjugated diene units having an olefinically unsaturated bond at the side chain to those of the whole conjugated diene units in the resulting conjugated diene polymer or conjugated diene-vinyl aromatic compound random copolymer can be controlled by using an ether, a tertiary amine, and alkoxide, phenoxide, sulfonate or the like of alkaline metal such as sodium, potassium or the like and appropriately selecting from them.

It is also possible to obtain a branched polymer by adding a polyfunctional coupling agent immediately before completion of the polymerization, to perform the coupling reaction.

Examples of the coupling agent include tetrachlorosilane, butyltrichlorosilane, butyltrichlorotin, tetrachlorogermanium, bis(trichlorosilyl)ethane, divinylbenzene, adipic acid diester, epoxidized liquid butadiene, epoxidized soybean oil, epoxidized linseed oil, tolylene diisocyanate, diphenylmethane diisocyanate, 1,2,4-benzene triisocyanate and the like.

In order to hydrogenate the conjugated diene polymer or conjugated diene-vinyl aromatic compound random copolymer, the conjugated diene polymer or conjugated diene-vinyl aromatic compound random copolymer may be reacted with hydrogen at the temperature of 20 to 150° C. under a hydrogen pressure of 1 to 100 kg/cm$^2$ in a hydrocarbon solvent in the presence of a hydrogenation catalyst (see, for example, JP-A-2-36244).

Examples of the hydrogenation catalyst include catalysts prepared by supporting a noble metal such as palladium, ruthenium, rhodium, platinum or the like, on a carrier such as silica, carbon, diatomaceous earth or the like; catalysts composed of a metal complex of ruthenium, rhodium, platinum or the like, an organic carboxylate of cobalt, nickel or the like and an organoaluminum or organolithium; and catalysts composed of a titanium compound such as dicyclopentadienyltitanium dichloride, dicyclopentadienyldiphenyltitanium, dicyclopentadienyltitanium ditolyl, dicyclopentadienylbenzyl or the like and an organometallic compound of lithium, aluminum, magnesium or the like.

According to the hydrogenation, the olefinically unsaturated bond at the side chain or in the backbone chain contained in the conjugated diene polymer or conjugated diene-vinyl aromatic compound random copolymer is hydrogenated, thereby obtaining a hydrogenated diene copolymer used in the present invention. It is necessary that the hydrogenation degree of the hydrogenated diene copolymer used in the present invention is not less than 70%. When the hydrogenation degree is less than 70% by weight, the durability, particularly heat resistance and light resistance, of the molded article obtained from the resulting thermoplastic elastomer composition powder is deteriorated, and faults such as crack, whitening, etc. arise.

The term "hydrogenation degree" used herein means a ratio of the number of olefinically unsaturated bonds at the side chain or in the backbone chain after hydrogenation to the number of olefinically unsaturated bonds at the side chain or backbone chain of the conjugated diene unit before hydrogenation. The hydrogenation degree is preferably not less than 90%, more preferably not less than 95%.

The hydrogenated diene polymer (b) may contain a small amount of a styrene block (total amount: not more than 10% by weight) at a terminal.

The amount of the hydrogenated diene polymer (b) is within the range from 5 to 250 parts by weight, preferably from 20 to 250 parts by weight, more preferably from 50 to 250 parts by weight, most preferably from 80 to 220 parts by weight, based on 100 parts by weight of the polyolefin resin. The ethylene/α-olefin copolymer rubber (c) optionally used, is at least one selected from a non-crystalline ethylene/α-olefin copolymer and a non-crystalline ethylene/α-olefin/non-conjugated diene copolymer. Examples of the preferable α-olefin include α-olefins having 3 to 10 carbon atoms such as propylene, 1-butene, 3-methyl-1-pentene-1, 1-octene, 1-decene and the like. Among them, propylene and 1-butene are particularly preferable. Examples of the preferable non-conjugated diene include dicyclopentadiene, 2-methyl-2,5-norbornadiene, 5-ethylidene-2-norbornene, 1,4-hexadiene, cyclooctadiene, methylenenorbornene, 1,6-octadiene and the like. Among them, the ethylidenenorbornene is particularly preferable. Examples of the ethylene/α-olefin copolymer rubber (c) include ethylene-propylene copolymer rubber, ethylene-1-butene copolymer rubber, ethylene-propylene-5-ethylidene-2-norbornene copolymer rubber (EPDM) and the like. The thermoplastic elastomer composition of the present invention, containing EPDM can give a molded article which is particularly superior in heat resistance and tensile characteristics. The content of the α-olefin unit in the ethylene/α-olefin copolymer rubber (c) is preferably within the range from 5 to 40% by weight, more preferably from 10 to 35% by weight. The content of the ethylene unit is normally from 60 to 95% by weight, preferably from 65 to 90% by weight. The content of the α-olefin unit and ethylene unit can be determined by the $^{13}$C-NMR measurement, infrared spectroscopy or the like. When a molded article is produced by using powder of the thermoplastic elastomer composition of the present invention according to the powder molding method, the Mooney viscosity $\{ML_{1+4}(100°\ C.)\}$ measured at 100° C. according to ASTM D-927-57T of the ethylene/α-olefin copolymer rubber (c) is normally within the range from 10 to 350, preferably from 15 to 300, from view point of the strength of the resulting molded article.

The content of the ethylene/α-olefin copolymer rubber (c) in the thermoplastic elastomer composition of the present invention is normally from 0 to 500 parts by weight based on 100 parts by weight of the polyolefin resin (a). When using the ethylene/α-olefin copolymer rubber (c), the amount of (b) is preferably not more than 100 parts by weight based on 100 parts of the total of (a) and (c). In view of the cold resistance (low-temperature impact resistance) of the resulting molded article, the weight ratio of the ethylene/α-olefin copolymer rubber (c) to the polyolefin resin (a) [(c):(a)] is preferably within the range from 5:95 to 80:20, preferably from 20:80 to 70:30.

In the thermoplastic elastomer composition of the present invention, the polyolefin resin (a), hydrogenated diene polymer (b) and ethylene/α-olefin copolymer rubber (c) may be crosslinked in the molecule and/or inter-molecules. That is, the polyolefin resin (a) may be crosslinked in the molecule and/or inter-molecules, the hydrogenated diene polymer (b) may be crosslinked in the molecule and/or inter-molecules, or the ethylene/α-olefin copolymer rubber (c) may be crosslinked in the molecule and/or inter-molecules. Furthermore, the polyolefin resin (a) and hydrogenated diene polymer, or the polyolefin resin (a) and ethylene/α-olefin copolymer (c), or the hydrogenated diene polymer (b) and ethylene/α-olefin copolymer (c) may be crosslinked in inter-molecules. For example, the crosslinking of the polyolefin resin (a) and/or ethylene/α-olefin copolymer rubber (c) can be conducted by kneading the polyolef in resin (a) with the ethylene/α-olefin copolymer rubber (c) and then dynamically crosslinking the kneaded mixture. The dynamic crosslinking of the kneaded mixture can be conducted, for example, by kneading the kneaded mixture with a crosslinking agent with heating. As the crosslinking agent, organic peroxides such as 2,5-dimethyl-2,5-di(tert-butylperoxyno) hexane, dicumyl peroxide , etc. can be used. The crosslinking agent is normally used in an amount of not more than 1 part by weight, preferably from 0.1 to 0.8 parts by weight, more preferably from 0.2 to 0.6 parts by weight, based on 100 parts by weight of the total of the polyolefin resin (a), hydrogenated diene polymer (b) and ethylene/α-olefin copolymer (c) to be crosslinked. When using the organic peroxide as the crosslinking agent, it is possible to obtain a thermoplastic elastomer composition which gives a molded article having an excellent heat resistance, if the dynamic crosslinking is conducted in the presence of a crosslinking aid such as bismaleimide compound, etc. In this case, the amount of the organic peroxide is normally not more than 0.8 parts by weight, preferably from 0.2 to 0.8 parts by weight, more preferably from 0.4 to 0.6 parts by weight based on 100 parts by weight of the total of the polyolefin resin (a), hydrogenated diene polymer (b) and ethylene/α-olefin copolymer rubber (c). The amount of the crosslinking aid is normally not more than 1.5 parts by weight, preferably from 0.2 to 1 parts by weight, more preferably from 0.4 to 0.8 parts by weight, based on 100 parts by weight of the total of the polyolefin resin (a), hydrogenated diene polymer (b) and ethylene/α-olefin copolymer rubber (c). The crosslinking aid is preferably blended before addition of the crosslinking agent, and is normally added at kneading of the above components (a), (b) and (c) to be crosslinked. The crosslinking of the polyolefin resin (a), hydrogenated diene polymer (b) and ethylene/α-olefin copolymer rubber (c) can be conducted by kneading these components and, if necessary, a crosslinking aid with heating, using a single-screw extruder, a twin-screw extruder or the like. By the dynamic crosslinking under the above conditions, the ethylene/α-olefin copolymer rubber (c) is normally crosslinked in the molecule and/or inter-molecules, preferentialy, but the polyolefin resin (a) is crosslinked in the molecule and/or between molecules, or the hydrogenated diene polymer (b) is crosslinked in the molecule and/or between molecules, or the polyolefin resin (a) and hydrogenated diene polymer (b) are crosslinked between molecules, or the polyolefin resin (a) and ethylene/α-olefin copolymer rubber (c) are crosslinked between molecules, or the hydrogenated diene polymer (b) and ethylene/α-olefin copolymer rubber (c) are crosslinked between molecules, sometimes. The thermoplastic elastomer composition of the present invention can contain any type of a crosslinked compound.

The thermoplastic elastomer composition of the present invention may contain various additives, in addition to the above main components. Examples of the additive include mineral oil softeners such as paraffin process oil, etc.; phenol, sulfite, phenylalkane, phosphite, amine or amide thermal stabilizers; antioxidants; weathering agents; antistatic agents; lubricants such as metal soap, wax, etc.; internal mold release agents such as methylpolysiloxane crystalline compound, etc.; coloring pigments; fillers; foaming agents; foaming aids; and cell adjustors. Among them, the mineral oil softeners makes it possible to improve the melt flow property of the thermoplastic elastomer composition of the present invention and to give a molded article which is superior in flexibility and, therefore, it is preferable. In the production of the thermoplastic elastomer composition of the present invention, when using a composition of this mineral oil softener and the above ethylene/α-olefin copolymer rubber (c), a so-called oil-extended ethylene/α-olefin copolymer rubber, excellent processability in the kneading or dynamic crosslinking can be imparted. The content of the mineral oil softener in the oil-extended ethylene/α-olefin copolymer rubber is normally not more than 120 parts by weight, preferably from 30 to 120 parts by weight, based on 100 parts by weight of the ethylene/α-olefin copolymer rubber (c).

As far as the effect of the present invention is not adversely affected, the thermoplastic elastomer composition of the present invention may contain rubbery polymers such as natural rubber, butyl rubber, chloroprene rubber, acrylonitrile/butadiene rubber, hydrogenated acryloitrile/butadiene rubber, epichlorohydrin rubber, styrene/ butadiene/styrene block copolymer (SBS), styrene/isoprene/styrene block copolymer (SIS) and the like, and polymer components such as ethylene/acrylic acid copolymer, ethylene/vinyl acetate copolymer and saponified product thereof, ethylene/methyl methacrylate copolymer, ethylene/glycidyl methacrylate/vinyl acetate copolymer and the like.

Various ranges of viscoelasticity of the thermoplastic elastomer of the present invention can be permitted depending on the molding conditions of the composition. When a molded article is produced by powder molding of the thermoplastic elastomer composition powder of the present invention, the complex dynamic viscosity $\eta^*(1)$ measured at 250° C. under a vibration frequency $\omega$ of 1 radian/second is preferably not more than $5 \times 10^4$ poise, more preferably from $1 \times 10^2$ to $3 \times 10^3$, particularly from $3 \times 10^2$ to $2 \times 10^3$, from view point of the molding processability of the composition.

Herein, a complex dynamic viscosity $\eta^*(\omega)$ measured at 250° C. under a vibration frequency $\omega$ radian/second is calculated by using a storage viscoelasticity G'($\omega$) and a loss viscoelasticity G"($\omega$) measured at 250° C. under a vibration frequency $\omega$ according to the formula (1):

$$\dot{\eta}(\omega) = \frac{1}{\omega}\sqrt{\{[G'(\omega)]^2 + [G''(\omega)]^2\}} \qquad (1)$$

When $\eta^*(1)$ exceeds $5 \times 10^4$ poise, the melt flow property of the thermoplastic elastomer composition powder becomes insufficient and the processability tends to become poor. From view point of the mechanical strength of the resulting molded article, a Newtonian viscosity index n calculated by using the above complex dynamic viscosity $\eta^*(1)$ and a complex dynamic viscosity $\eta^*(100)$ measured al 250° C. under a vibration frequency $\omega$ of 100 radian/second according to the formula (2):

$$n = \frac{1}{2}\{\log\dot{\eta}(1) - \log\dot{\eta}(100)\} \qquad (2)$$

is preferably not more than 0.28, more preferably from 0.01 to 0.25, particularly from 0.03 to 0.20.

The thermoplastic elastomer composition of the present invention can also be produced, for example, by kneading the polyolefin resin (a) and hydrogenated diene polymer (b) and, if necessary, the ethylene/α-olefin copolymer rubber (c). When using the ethylene/α-olefin copolymer rubber (c), the thermoplastic elastomer composition can be produced by kneading the polyolefin resin (a) with the ethylene/α-olefin copolymer rubber (c), further adding the hydrogenated diene polymer, followed by kneading. For example, the thermoplastic elastomer composition of the present invention, wherein the polyolefin resin (a) and/or ethylene/α-olefin copolymer rubber (c) are crosslinked in the molecule and/or between molecules, can be normally produced by crosslinking the polyolefin resin (a) dynamically with the ethylene/α-olefin copolymer rubber (c) , adding the hydrogenated diene polymer (b), followed by kneading. In the kneading of the hydrogenated diene copolymer (b), a single-screw extruder, a twin-screw extruder or the like can be used. The thermoplastic elastomer composition of the present invention can also be produced by dynamically crosslinking a mixture of the polyolefin resin (a), hydrogenated diene polymer (b) and ethylene/α-olefin copolymer rubber (c). By the method described above, the thermoplastic elastomer composition of the present invention can be obtained as a melt kneaded mixture. The blending of various additives can be conducted, for example, by using the polyolefin resin (a), hydrogenated diene polymer (b) or ethylene/α-olefin copolymer rubber (c) wherein these additives are previously blended, or blending during the kneading or dynamic crosslinking of the above components (a), (b) and (c).

The thermoplastic elastomer composition powder of the present invention can be processed into a molded article such as sheet, film, etc. by powder molding. In view of ease of heat fusing of particles on powder molding, a sphere-reduced average diameter of the powder is preferably not more than 1.2 mm, more preferably from 0.15 to 1.0 mm. When the heat fusion of powder is insufficient, the molded article easily arises pinholes, wormholes and the like. In view of ease of adhesion of powder to the mold surface on molding, the bulk specific gravity is preferably not less than 0.38, more preferably from 0.38 to 0.65, particularly from 0.42 to 0.65. When the adhesion of the powder to the mold surface is insufficient, the molded article easily arises pinholes, wormholes and the like.

Herein, the sphere-reduced average diameter of the powder is defined as a diameter of a sphere which has the same volume as an average volume of the powder. The average volume (v) per one particle of the powder is defined by the following equation:

V=W/(100×D).

where W is a total weight of one hundred particles of a thermoplastic composition powder, randomly taken out, D is a density of the thermoplastic elastomer composition and V is an average volume. The bulk specific density of the powder is defined and measured according to JIS K-6721.

The powder described above can be produced by various methods described hereinafter.

Freeze-pulverization/solvent treatment method: A thermoplastic elastomer composition is cooled to it's glass transition temperature or less (normally not more than −70° C., preferably not more than −90° C.) and then pulverized.

Then, the powder produced by the above freeze-pulverization is stirred in a solvent which is inferior in compatibility with the thermoplastic elastomer composition at melt temperature or more of the thermoplastic elastomer composition, preferably a temperature which is higher by 30–50° C. than the melt temperature, in the presence of a dispersant and an emulsifier (see JP-A-62-280226).

Strand-cut method: A molten thermoplastic elastomer composition is extruded into airthrough a die to form a strand, which is cooled and then cut (see JP-A-50-149747).

Die-face cut method: A molten thermo plastic elastomer composition is cut with extruding into water through a die.

In the above solvent treatment method, as the solvent, for example, ethylene glycol, polyethylene glycol or the like is normally used in an amount within the range from 300 to 1000 parts by weight, preferably from 400 to 800 parts by weight, based on 100 parts by weight of the thermoplastic elastomer composition. As the dispersant, for example, ethylene-acrylic acid copolymer, silicic anhydride, titanium oxide or the like is normally used in an amount within the range from 5 to 20 parts by weight, preferably from 10 to 15 parts by weight, based on 100 parts by weight of the thermoplastic elastomer composition. As the emulsifier, for example, polyoxyethylene sorbitan monolaurate, polyethylene glycol monolaurate, sorbitan tristearate or the like is normally used in an amount within the range from 3 to 15 parts by weight, preferably from 5 to 10 parts by weight, based on 100 parts by weight of the thermoplastic elastomer composition. In the above strand-cut method, a diameter of an orifice of the die is normally within the range from 0.1 to 3 mm, preferably from 0.2 to 2 mm. A discharge rate of the thermoplastic elastomer composition per one orifice of the die is normally within the range from 0.1 to 5 kg/hour, preferably from 0.5 to 3 kg/hour. A haul-off rate of the strand is normally within the range from 1 to 100 m/minute, preferably from 5 to 50 m/minute. The cooled strand is normally cut into a length of 1.4 mm or less, preferably from 0.3 to 1.2 mm. In the above die-face cut method, a diameter of an orifice of the die is normally within the range from 0.1 to 3 mm, preferably from 0.2 to 2 mm. A discharge rate of the thermoplastic elastomer composition per one orifice of the die is normally within the range from 0.1 to 5 kg/hour, preferably from 0.5 to 3 kg/hour. The temperature of water is normally within the range from 30 to 70° C., preferably from 40 to 60° C.

The powder of the above thermoplastic elastomer composition can be applied to various powder molding methods (e.g. powder slush molding, fluidization dip method, electrostatic coating, powder spray method, powder rotational molding, etc.), press molding, extrusion molding and injection molding. For example, powder slush molding is conducted as follows: First, powder of a thermoplastic elastomer composition is supplied onto the molding surface of a mold heated to a melt temperature of the composition or more, normally from 160 to 300° C., preferably from 210 to 270° C. The powder was heated on the molding surface for a predetermined time, and powder wherein at least surface thereof is molten are fused each other. After a lapse of the predetermined time, non-fused powders are recovered. If necessary, the mold on which molten thermoplastic elastomer composition was placed is further heated. Then, the mold is cooled and a sheet formed thereon is released from the mold. In such a process, the mold is heated, for example, by a gas heating furnace system, a heat medium oil circulating system, a system of dipping in heat medium oil or heat fluidized sand, a radio-frequency induction heating system or the like. The heating time for heat-fusing the thermoplastic elastomer composition powder is appropriately selected according to the size or thickness of the desired molded article.

The molded article of the present invention obtained from the thermoplastic elastomer powder of the present invention has such an advantage that deficiencies(e.g. wormhole, pinhole, etc.) do not arise and the moldability is superior and, furthermore, whitening does not arise easily on bending.

Using the thermoplastic elastomer composition powder containing a foaming agent of the present invention, a foamed article having excellent flexibility can be produced by various molding methods such as powder molding method, press molding method, extrusion molding method, injection molding method and the like. For example, a foamed article can be produced by powder molding the thermoplastic elastomer composition powder of the present invention containing a foaming agent, followed by foaming.

The foaming agent may be contained previously in the powder, or may be coated on the surface of the powder with a rotary mixer such as a Henschel mixer or the like.

As the foaming agent, a thermal decomposition type foaming agent is normally used. Examples of the thermal decomposition type foaming agent include azo compounds such as azodicarbonamide, 2,2'-azobisisobutyronitrile, diazodiaminobenzene, etc.; sulfonyl hydrazide compounds such as benzenesulfonyl hydrazide, benzene-1,3-sulfonyl hydrazide, p-toluenesulfonyl hydrazide, etc.; nitroso compounds such as N,N'-dinitrosopentamethylenetetramine, N,N'-dinitroso-N,N'-dimethylterephthalamide, etc.; azide compounds such as teraphthalazide, etc.; and carbonates such as sodium hydrogencarbonate, ammonium hydrogencarbonate, ammonium carbonate, etc. Among them, azodicarbonamide is preferably used. The foaming agent is normally blended at a temperature below the decomposition temperature of the foaming agent. The thermoplastic elastomer composition of the present invention may contain a foaming aid and a cell adjuster, together with the foaming agent.

The molded article obtained from the thermoplastic elastomer composition of the present invention can constitute a two-layer molded article, for example, by laminating foamed article. Such a two-layer molded article can be produced, for example, by the powder molding method disclosed in JP-A-5-473, and can also be produced by the method of bonding a molded article and foamed article individually produced from the thermoplastic elastomer composition of the present invention, with an adhesive. In case of producing according to the powder molding method, the two-layer molded article can be produced by forming a layer of the thermoplastic elastomer composition containing no foaming agent of the present invention on a mold for powder molding according to the method as described above, further feeding a composition containing a foaming agent and a thermoplastic resin (or a thermoplastic elastomer) on the layer, heat-fusing powder to form a new layer, and foaming the layer of the composition containing the foaming agent. It is also possible to produce a composite molded article having a construction of a non-foamed layer/foamed layer/non-foamed layer according to a similar process. Two non-foamed layers may be the same or different. As the foaming agent used in the production of the above two-layer molded article and composite molded article, the same thermal decomposition type foaming agent as that described above can be used. Examples of the thermoplastic resin or thermoplastic elastomer contained in the composition containing the foaming agent include vinyl chloride resins, polyolefin resins, olefin thermoplastic elastomers and the like. As the above composition containing the foaming agent, a polyethylenic foamable composition disclosed in JP-A-7-228720 can also be used.

The foamed layer may be those composed of the foamed polyurethane. In this case, since the bonding between the thermoplastic elastomer composition of the present invention and polyurethane is inferior, the bonding is preferably improved by pre-treating the surface of the thermoplastic elastomer resin of the present invention with a primer such as chlorinated polyethylene, etc. The foamed layer of the foamed polyurethane can be formed, for example, by supplying a mixed solution of polyol, polyisocyanate and a foaming agent between the molded article of the thermoplastic elastomer composition of the present invention and a resin core described hereinafter, followed by foaming.

The molded article obtained by molding the above-described thermoplastic elastomer composition powder of the present invention, or the composite molded article comprising a layer of the thermoplastic elastomer composition and a foamed layer can form a multi-layer molded article by being used as a skin material for resin molded article (resin core). For example, a sheet (surface material) of the thermoplastic elastomer composition of the present invention can constitute a two-layer molded article by being laminated on the resin core, and the two-layer molded article (two-layer skin material) composed of a layer of the thermoplastic elastomer of the present invention and a foamed layer can constitute a three-layer molded article by being laminated on the resin core at the foamed layer side.

Examples of the resin constituting the resin core include polyolefin resins such as polyethylene, polypropylene, etc.; and thermoplastic resins such as ABS resin (e.g. acrylonitrile/butadiene/styrene copolymer resin, etc.). Among them, polyolefin resins such as polypropylene and the like are preferably used.

The multi-layer molded article can be produced, for example, by feeding a molten resin on one side of the skin material, followed by pressurizing. The pressurization may be initiated after completion of the feeding of the resin, or may be initiated before completion of the feeding of the resin and continued after completion of the feeding of the resin. The pressurization may be conducted by clamping of a molding device or a feeding pressure of the resin.

In the production of the above multi-layer molded article, there can be applied various methods such as injection molding method, low-pressure injection molding method, low-pressure compression molding method and the like. For example, using a molding device comprising a pair of first and second mold members, capable of freely moving between the opening position and closing position, relatively, a skin material containing a layer of the thermoplastic elastomer composition of the present invention between the fist and second mold members located at the opening position, and then a molten resin is supplied between the skin material and one mold member. After supplying or with supplying the resin, the first and second mold members are relatively moved to compress the skin material and resin, thereby making it possible to produce a multi-layer molded article. For example, when using a skin material comprising a layer of the thermoplastic elastomer composition of the present invention and a foamed layer, a molten resin is supplied between the foamed layer of the skin material and the mold member which is opposite the foamed layer in the above process. In the above process, the resin can be supplied between the skin material and mold member can be conducted through a resin passage provided in the mold member, and the resin can also be supplied by inserting a resin supplying nozzle of a resin supplying device provided at the outside of the molding device, and removing the resin supplying nozzle. The moving direction of the first and second mold members is not specifically limited, and may be a vertical or horizontal direction.

The above method is more preferable compared with the injection molding method wherein a molten thermoplastic resin is supplied in the state that the first and second mold members are kept at the closing position, because the position of the skin material hardly shifts and damage of the skin material can also be avoided.

When using the skin material produced by the above described powder molding method, the mold used in the powder molding method can be applied as the mold member for production of a multi-layer molded article. In this case, the multi-layer molded article can be normally produced by attaching a mold for powder molding to the above first mold member with holding the skin material formed by the powder molding on the molding surface, and conducting the same operation. According to this method, the multi-layer molded article can be produced by without damaging the pattern provided on the surface of the skin material by the powder molding.

A pair of the above mold members can be a pair of so-called male/female mold members wherein the outer periphery of the first mold member and inner periphery of the second mold member are capable of sliding. In this case, by setting a distance (clearance) between the inner periphery and outer periphery to almost the same value as that of a thickness of the skin material to be used, a multi-layer molded article having an excess skin material at the edge portion. A multi-layer molded article coated with the skin material every edge portion can be produced by turning up this excess skin material to the back surface of the multi-layer molded article.

EXAMPLES

The following Examples further illustrate the present invention in detail but the present invention is not limited to these Examples.

Evaluation Method

[1] Complex Dynamic Viscosity $\eta^*(1)$

Using a dynamic analyzer (manufactured by Rheometrics Co., Model RDS-7700), a storage rigidity $G'(1)$ and a loss rigidity $G''(1)$ were measured at a parallel plate mode under the conditions of an applied strain of 5%, a sample temperature of 250° C. and a vibration frequency $\omega$ of 1 radian/second, and then $\eta^*(1)$ was calculated from these values by the above formula (1).

[2] Newtonian Viscosity Index n

According to the same manner as that of the measurement of $\eta^*(1)$ except for changing the vibration frequency $\omega$ on measurement of the storage rigidity and loss rigidity to 100 radian/second, a complex dynamic $\eta^*(100)$ of the same sample as that used in the measurement of $\eta^*(1)$. Using the resulting $\eta^*(1)$ and $\eta^*(100)$, n was calculated by the above formula (2).

[3] Sphere-reduced Average Diameter of Powder of Thermoplastic Elastomer Composition One hundred particles of the thermoplastic elastomer composition were collected at random and the total weight was determined. An average volume per one particle was calculated from this value and a specific gravity of the thermoplastic elastomer composition, and then a diameter of a sphere having the same volume as this average volume was calculated. The value thus obtained was taken as a sphere-reduced average diameter of the powder of the thermoplastic elastomer composition.

[4] Bulk Specific Density of Powder of Thermoplastic Elastomer Composition

According to JIS K-6721, a bulk specific density of the powder of the thermoplastic elastomer was calculated.

[5] Appearance of Molded Article

In the resulting molded article, the presence or absence of pinhole and wormhole at each edge of three convex portions A (7 mm in height×5 mm in width), B (11 mm in height×25 mm in width) and C (15 mm in height×25 mm in width) was visually observed, and the results were evaluated according to the following criteria.

4: Neither Pinhole nor wormhole was recognized at any edge of convex portions A, B and C.

3: Neither Pinhole nor wormhole was recognized at edges of convex portions A and B, but pinhole or wormhole was recognized at the edge of the convex portion C.

2: Neither Pinhole nor wormhole was recognized at the edges of the convex portion A, but pinhole or wormhole was recognized at the edges of the convex portions B and C.

1: Pinhole or wormhole was recognized at any edge of convex portions A, B and C.

[6] Test of Whitening on Bending of Molded Article

To a molded article bent at the center portion, a load of 500 gf or 1 kgf was applied for 1 minute and, after removing the load, the whitening state of the bent portion of the molded article was visually observed and evaluated according to the following criteria.

○: Whitening was hardly recognized.

Δ: Whitening was slightly recognized.

X: Severe whitening was recognized.

[7] Hardness of Molded Article

The molded article was cut into pieces of 1 cm×5 cm and 10 pieces were piled, and then a Shore A-scale hardness was measured by using a Durometer-Shore A hardness tester.

Reference Example 1

(Production of Thermoplastic Elastomer)

An oil-extended EPDM rubber [trade name: Esprene E670F, $ML_{1+4}$(100° C.): 53] prepared by adding 25 parts by weight of a mineral oil softening agent [manufactured by Idemitsu Kosan Co., Ltd., trade name: Diana Process PW-380] to 25 parts by weight of EPDM [manufactured by Sumitomo Chemical Co., Ltd., $ML_{1+4}$(100° C.): 242, content of propylene unit: 28% by weight, iodine value: 12] was used. To 50 parts by weight of the oil-extended EPDM rubber, 50 parts by weight of an ethylene-propylene random copolymer resin [content of ethylene unit: 4.5% by weight, MFR: 90 g/10 minutes] and 0.6 parts by weight of a crosslinking aid [bismaleimide compound, manufactured by Sumitomo Chemical Co., Ltd., trade name: Sumifine BM] were added and the mixture was kneaded for 10 minutes using a Banbury mixer to obtain a master batch for crosslinking (hereinafter referred to as "M.B."). This M.B. was formed into pellets using an extruder and a cutter.

To 100 parts by weight of pellets of M.B., 0.4 parts by weight of an organic peroxide [2,3-dimethyl-2,5-di(t-butylperoxyno)hexane, manufactured by Sanken Kako Co., Ltd., trade name: Sanperox APO] and the mixture was dynamically crosslinked by kneading at 200° C. under a shear rate of $1.2 \times 10^3$ second$^{-1}$ using a twin-screw extruder to obtain a thermoplastic elastomer (complex dynamic viscosity $\eta^*(1)$: $1.5 \times 10^3$ poise, Newtonian viscosity index n: 0.25). Then, this thermoplastic elastomer was extruded from the twin-screw extruder and formed into pellets using a cutter.

Example 1

(Production of Thermoplastic Elastomer Composition Powder)

100 Parts by weight of the thermoplastic elastomer obtained in Reference Example 1 and 10 parts by weight of a hydrogenated diene polymer [manufactured by Japan Synthetic Rubber Co., Ltd., Dynaron 1320P, butadiene-styrene random copolymer, content of styrene unit: 10% by weight, hydrogenation degree: 99%, $\eta^*(1)$: $2.1 \times 10^4$ poise, n: 0.23] were charged in a 30 mm φ extruder, heated to 160° C. and kneaded. Then, the resultant was discharged through a die (temperature: 160° C.) having an orifice diameter of 1.0 mm at a discharge rate of 1 kg/hour/hole, drawn at a haul-off rate of 32 m/minute, and cooled to obtain a strand having a diameter of 0.8 mm. This strand was cut using a pelletizer to obtain thermoplastic elastomer composition powder (complex dynamic viscosity $\eta^*(1)$: $1 \times 10^3$ poise, Newtonian viscosity index n: 0.16) having a sphere-reduced average diameter of 0.9 mm. The evaluation results are shown in Table 1.

(Production of Molded Article According to Slush Molding Method)

Figure 1:
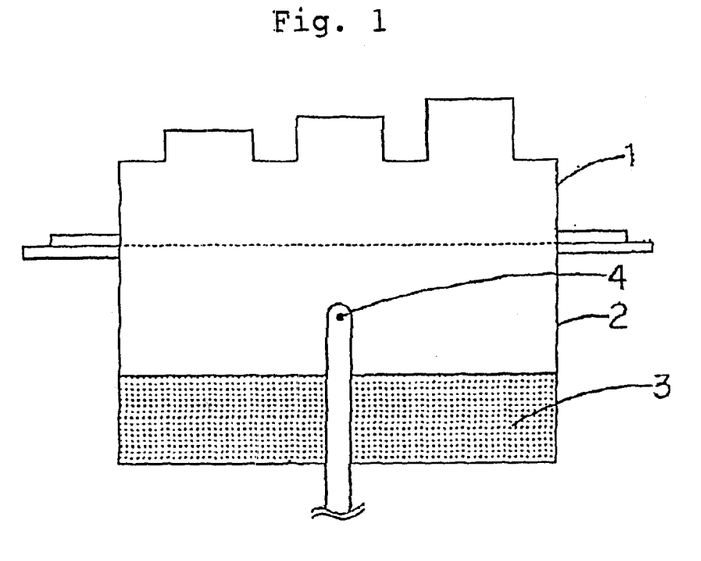
FIG. 1 is a schematic view of a molding apparatus for powder molding. This apparatus is provided with a container (2) for containing a powder (3) of a thermoplastic elastomer composition, and a mold (1) for powder slush molding.

The resulting thermoplastic elastomer composition powder (3) was charged in a container (2), and then the container (2) and a mold (1) for slush molding were integrated by fixing them each other so that their peripheral portions are closely contacted (FIG. 1).

Figure 2:
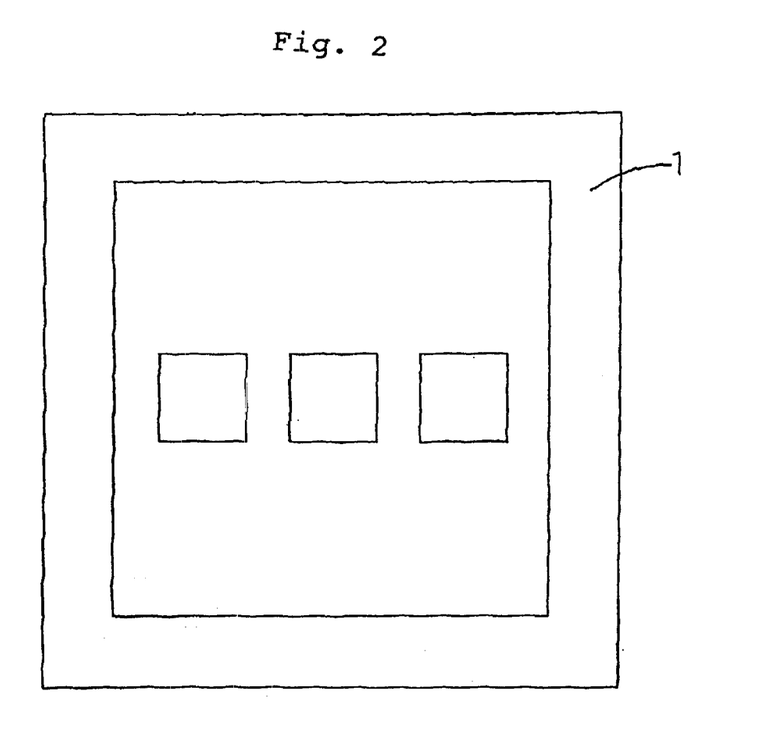
FIG. 2 is a planar view from the molding surface side of the mold for powder slush molding.

The mold (1) had three concave portions (7 mm, 11 mm or 15 mm in depth×25 mm in width) on the molding surface, as shown in FIG. 2, and the whole surface of the molding surface had a leather grained pattern. The temperature of the mold (1) was 250° C.

Immediately after that, the integrated mold/container was rotated on a rotating shaft for 180° using an uniaxial rotating device (not shown) to supply a thermoplastic elastomer composition powder (3) on the molding surface of the mold. After reciprocating twice at an amplitude within the range of ±45° over 15 seconds, the thermoplastic elastomer composition powder was adhered and molten on the molding surface. After rotating for 180° again, excess thermoplastic elastomer composition powder which was not adhered/molten was recovered in the container (2).

Then, the mold (1) with the thermoplastic elastomer composition being adhered/molten on the molding surface was removed from the container (2), heated in an oven at 250° C. for 2 minutes, cooled and released from the mold to obtain a molded article (5).

Figure 3:
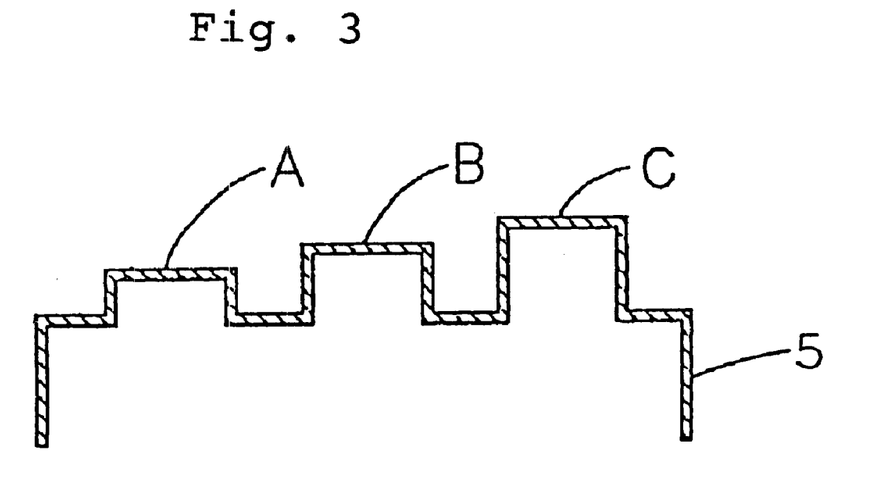
FIG. 3 is a sectional view of a molded article produced by using the mold of FIG. 2.

This molded article (5) had a thickness of 1.2 mm and three convex portions A (7 mm in height×25 mm in width), B (11 mm in height×25 mm in width) and C (15 mm in height×25 mm in width), and a leather grained pattern of the molding surface was precisely transferred over the whole surface.

A sectional view of this molded article (5) is illustrated in FIG. 3 and the evaluation results are shown in Table 1.

Examples 2 to 4 and Comparative Example 1

The same operation as that described in Example 1 was conducted except for adjusting the discharge rate and haul-off rate as described in Table 1, thermoplastic elastomer composition powder (complex dynamic viscosity $\eta^*(1)$: $1 \times 10^3$ poise, Newtonian viscosity index n: 0.16) was obtained, resulting in a molded article. The evaluation results are shown in Table 1.

Example 5

The same operation as that described in Example 1 was conducted except for changing the amount of the hydrogenated diene polymer to 20 parts by weight, thermoplastic elastomer composition powder (complex dynamic viscosity $\eta^*(1)$: $1 \times 10^3$ poise, Newtonian viscosity index n: 0.14) was obtained, resulting in a molded article. The evaluation results are shown in Table 1.

Comparative Example 2

100 Parts by weight of the thermoplastic elastomer obtained in Reference Example 1 and 10 parts by weight of a hydrogenated diene polymer [manufactured by Japan Synthetic Rubber Co., Ltd., Dynaron 1320P, butadiene-styrene random copolymer, content of styrene unit: 10% by weight, hydrogenation degree: 99%, $\eta^*(1)$: $2.1 \times 10^4$ poise, n: 0.23] were charged in a twin-screw extruder, heated to 200° C. and kneaded to obtain a thermoplastic elastomer composition (complex dynamic viscosity $\eta^*(1)$: $1 \times 10^3$ poise, Newtonian viscosity index n: 0.16) was obtained. This thermoplastic elastomer composition was cooled to −100° C. with liquid nitrogen and immediately pulverized in a cooled state to obtain thermoplastic elastomer composition powder capable of passing through a Tyler standard sieve 32 mesh (opening: 500 μm×500 μm). Then, the same operation as that described in Example 1 was conducted except for using this thermoplastic elastomer composition powder, a molded article was obtained. The evaluation results are shown in Table 1.

Reference Example 2

66.7 Parts by weight of an ethylene-propylene random copolymer resin [content of ethylene unit: 4.5% by weight, NMR: 228 g/10 minutes] and 33 parts by weight of an ethylene-propylene random copolymer rubber [manufactured by Sumitomo Chemical Co., Ltd., Esprene V0141, content of propylene unit: 27% by weight, MFR: 0.7 g/10 minutes] were kneaded at 200° C. under a shear rate of $1.2 \times 10^3$ second$^{-1}$ using a twin-screw extruder to obtain a thermoplastic elastomer (complex dynamic viscosity η*(1): $1.8 \times 10^3$ poise, Newtonian viscosity index n: 0.12).

Example 6

100 Parts by weight of the thermoplastic elastomer obtained in Reference Example 2 and 66.7 parts by weight of a hydrogenated diene polymer [manufactured by Japan Comparative Example 4

The thermoplastic elastomer obtained in Reference Example 1 was cooled to −100° C. with liquid nitrogen and immediately pulverized in a cooled state to obtain thermoplastic elastomer composition powder capable of passing through a Tyler standard sieve 32 mesh (opening: 500 μm×500 μm). Then, the same operation as that described in Example 1 was conducted except for using this thermoplastic elastomer composition powder, a molded article was obtained. The evaluation results are shown in Table 1.

TABLE 1

|  | Discharge rate (kg/hour/hole) | Haul-off rate (m/minute) | Sphere-reduced average diameter (mm) | Bulk specific gravity | Evaluation of molded article | Shore A-scale hardness | Whitening on bending test of molded article | |
|---|---|---|---|---|---|---|---|---|
|  |  |  |  |  |  |  | 500 gf | 1 kgf |
| Example 1 | 1 | 32 | 0.90 | 0.446 | 4 | 88 | ○ | ○ |
| Example 2 | 0.8 | 35 | 0.78 | 0.464 | 4 | 88 | ○ | ○ |
| Example 3 | 1.5 | 30 | 1.07 | 0.438 | 4 | 88 | ○ | ○ |
| Example 4 | 1 | 21 | 1.15 | 0.425 | 3 | 88 | ○ | ○ |
| Comparative example 1 | 1 | 14 | 1.25 | 0.435 | 2 | 88 | ○ | ○ |
| Example 5 | 1 | 32 | 0.65 | 0.445 | 4 | 86 | ○ | ○ |
| Comparative example 2 | — | — | 0.20 | 0.285 | 2 | 88 | ○ | ○ |
| Example 6 | 0.8 | 35 | 0.80 | 0.460 | 4 | 84 | ○ | ○ |
| Comparative example 3 | 0.8 | 30 | 0.91 | 0.450 | 4 | 92 | X | X |
| Comparative example 4 | — | — | 0.18 | 0.293 | 2 | 92 | X | X |

Synthetic Rubber Co., Ltd., Dynaron 1320P, butadiene-styrene random copolymer, content of styrene unit: 10% by weight, hydrogenation degree: 99%, η*(1): $2.1 \times 10^4$ poise, n: 0.23] were charged in a 30 mm φ extruder, heated to 160° C. and kneaded. Then, the resultant was discharged through a die (temperature: 160° C.) having an orifice diameter of 1.0 mm at a discharge rate of 0.8 kg/hour/hole, drawn at a haul-off rate of 35 m/minute, and cooled to obtain a strand having a diameter of 0.8 mm. This strand was cut using a pelletizer to obtain thermoplastic elastomer composition powder (complex dynamic viscosity η*(1): $4 \times 10^3$ poise, Newtonian viscosity index n: 0.14) having a sphere-reduced average diameter of 0.8 mm. Then, the same operation as that described in Example 1 was conducted to obtain a molded article. The evaluation results are shown in Table 1.

Comparative Example 3

100 Parts by weight of the thermoplastic elastomer obtained in Reference Example 1 was charged in a 30 mm φ extruder, heated to 160° C. and kneaded. Then, the resultant was discharged through a die (temperature: 160° C.) having an orifice diameter of 1.0 mm at a discharge rate of 0.8 kg/hour/hole, drawn at a haul-off rate of 30 m/minute, and cooled to obtain a strand having a diameter of 0.8 mm. This strand was cut using a pelletizer to obtain thermoplastic elastomer powder having a sphere-reduced average diameter of 0.91 mm. Then, the same operation as that described in Example 1 was conducted to obtain a molded article. The evaluation results are shown in Table 1.

Example 7
(Production of Thermoplastic Elastomer Composition Powder)

100 Parts by weight of an ethylene-propylene random copolymer resin [content of ethylene unit: 4.5% by weight, MFR: 228 g/10 minutes] and 100 parts by weight of a hydrogenated diene polymer [manufactured by Japan Synthetic Rubber Co., Ltd., Dynaron 1320P, butadiene-styrene random copolymer, content of styrene unit: 10% by weight, hydrogenation degree: 99%, η*(1): $2.1 \times 10^4$ poise, n: 0.23] were charged in a 30 mm φ extruder, heated to 160° C. and kneaded. Then, the resultant was discharged through a die (temperature: 160° C.) having an orifice diameter of 1.0 mm at a discharge rate of 1 kg/hour/hole, drawn at a haul-off rate of 32 m/minute, and cooled to obtain a strand having a diameter of 0.8 mm. This strand was cut using a pelletizer to obtain thermoplastic elastomer composition powder (complex dynamic viscosity η*(1): $1.2 \times 10^3$ poise, Newtonian viscosity index n: 0.12) having a sphere-reduced average diameter of 0.91 mm.

According to the same manner as that described in Example 1, a molded article was obtained. The evaluation results are shown in Table 2.

Example 8

The same operation as that described in Example 7 was conducted except for changing the amount of the ethylene-butene copolymer rubber to 200 parts by weight, thermoplastic elastomer composition powder (complex dynamic viscosity η*(1): $4 \times 10^3$ poise, Newtonian viscosity index n: 0.14) was obtained, and then a molded article was obtained. The evaluation results are shown in Table 2.

Comparative Example 5

The same operation as that described in Example 7 was conducted except for adjusting the discharge rate from the die and take-off rate as described in Table 1, thermoplastic elastomer composition powder (complex dynamic viscosity η*(1): 1.2×10³ poise, Newtonian viscosity index n: 0.12) was obtained, and then a molded article was obtained. The evaluation results are shown in Table 2.

Comparative Example 6

100 Parts by weight of an ethylene-propylene random copolymer resin [content of ethylene unit: 4.5% by weight, MFR: 228 g/10 minutes] and 100 parts by weight of a hydrogenated diene polymer [manufactured by Japan Synthetic Rubber Co., Ltd., Dynaron 1320P, butadiene-styrene random copolymer, content of styrene unit: 10% by weight, hydrogenation degree: 99%, η*(1): 2.1×10⁴ poise, n: 0.23] were charged in a twin-screw extruder, heated to 200° C. and kneaded to obtain thermoplastic elastomer composition powder (complex dynamic viscosity η*(1): 1.2×10³ poise, Newtonian viscosity index n: 0.12). This thermoplastic elastomer composition was formed into pellets using a cutter.

The pellets of the thermoplastic elastomer obtained as described above were cooled to −100° C. with liquid nitrogen and immediately ground in a cooled state to obtain a thermoplastic elastomer composition powder capable of passing through a Tyler standard sieve 32 mesh (opening: 500 μm×500 μm). Then, the same operation as that described in Example 7 was conducted except for using this thermoplastic elastomer composition powder, a molded article was obtained. The evaluation results are shown in Table 2.

Comparative Example 7

An oil-extended EPDM rubber [trade name: Esprene E670F] prepared by adding 25 parts by weight of a mineral oil softening agent [manufactured by Idemitsu Kosan Co., Ltd., trade name: Diana Process PW-380] to 25 parts by weight of EPDM [manufactured by Sumitomo Chemical Co., Ltd., $ML_{1+4}$(100° C.): 242, content of propylene unit: 28% by weight, iodine value: 12] was used. To this oil-extended EPDM rubber, 50 parts by weight of an ethylene-propylene random copolymer resin [content of ethylene unit: 4.5% by weight, MFR: 90 g/10 minutes] and 0.6 parts by weight of a crosslinking aid [bismaleimide compound, manufactured by Sumitomo Chemical Co., Ltd., trade name: Sumifine BM] were added and the mixture was kneaded for 10 minutes using a Banbury mixer to obtain a crosslinking masterbatch (hereinafter referred to as "M.B."). This M.B. was formed into pellets using an extruder and a cutter.

To 100 parts by weight of pellets of M.B., 0.4 parts by weight of an organic peroxide [2,3-dimethyl-2,5-di(t-butylperoxyno)hexane, manufactured by Sanken Kako Co., Ltd., trade name: Sanpelox APO] and the mixture was kneaded at 200° C. under a shear rate of 1.2×10³ second⁻¹ using a twin-screw extrude and then dynamically crosslinked to obtain a thermoplastic elastomer (complex dynamic viscosity η*(1): 1.5×10³ poise, Newtonian viscosity index n: 0.25). Then, this thermoplastic elastomer was extruded from the twin-screw extruder and formed into pellets using a cutter.

This thermoplastic elastomer was charged in a 30 mm φ extruder, and then kneaded at 160° C. Then, the resultant was discharged through a die (temperature: 160° C.) having an orifice diameter of 1.0 mm at a discharge rate of 1 kg/hour/hole, drawn at a haul-off rate of 32 m/minute, and cooled to obtain a strand having a diameter of 0.8 mm. This strand was cut using a pelletizer to obtain thermoplastic elastomer composition powder (complex dynamic viscosity η*(1): 1.4×10³ poise, Newtonian viscosity index n: 0.13) having a sphere-reduced average diameter of 0.91 mm.

Then, the same operation as that described in Example 7 was conducted except for using the thermoplastic elastomer composition powder obtained as described above in place of the thermoplastic elastomer composition powder obtained in Example 7, a molded article was obtained. The evaluation results are shown in Table 2.

Comparative Example 8

The pellets of the thermoplastic elastomer obtained in Comparative Example 7 were cooled to −100° C. with liquid nitrogen and immediately ground in a cooled state to obtain thermoplastic elastomer composition powder capable of passing through a Tyler standard sieve 32 mesh (opening: 500 μm×500 μm). Then, the same operation as that described in Example 7 was conducted except for using this thermoplastic elastomer composition powder, a molded article was obtained. The evaluation results are shown in Table 2.

TABLE 2

| | Discharge rate (kg/hour/hole) | Haul-off rate (m/minute) | Sphere-reduced average diameter (mm) | Bulk specific gravity | Evaluation of molded article | Shore A-scale hardness | Whitening on bending test of molded article | |
|---|---|---|---|---|---|---|---|---|
| | | | | | | | 500 gf | 1 kgf |
| Example 7 | 1 | 32 | 0.91 | 0.465 | 4 | 88 | ○ | ○ |
| Example 8 | 1 | 32 | 0.94 | 0.465 | 4 | 80 | ○ | ○ |
| Comparative example 5 | 1 | 14 | 1.25 | 0.470 | 2 | 88 | ○ | ○ |
| Comparative example 6 | — | — | 0.20 | 0.290 | 2 | 88 | ○ | ○ |
| Comparative example 7 | 0.8 | 30 | 0.88 | 0.460 | 4 | 92 | X | X |
| Comparative example 8 | — | — | 0.18 | 0.293 | 2 | 92 | X | X |

Industrial Placticability

The powder of a thermoplastic elastomer composition of the present invention can give a molded article having excellent appearance, which does not raise deficiencies such as wormhole, pinhole and the like regardless of a complicated shape and does not cause whitening easily on bending.

What is claimed is:

1. A thermoplastic elastomer composition powder comprising a thermoplastic elastomer composition having a number average sphere-reduced diameter of not more than 1.2 mm and a bulk specific density of not less than 0.38, wherein the thermoplastic elastomer composition is selected from the group consisting of
  (1) a mixture, comprising:
    (a) 100 parts by weight of a crystallizable polyolefin resin;
    (b) 20 to 250 parts by weight of a hydrogenated conjugated diene polymer or a hydrogenated conjugated diene copolymer having a hydrogenation degree of not less than 70%, which is prepared by hydrogenating a conjugated diene-vinyl aromatic compound random copolymer in which the content of vinyl aromatic compound unit is not more than 25% by weight; and
    (c) 10 to 350 parts of an ethylene/α-olefin copolymer rubber; and
  (2) a dynamically crosslinked product of said composition (1), wherein the powder is produced by a solution treatment method, strand-cut method or die-face cut method, the thermoplastic elastomer composition has a complex dynamic viscosity η*(1) measured at 250° C. under a vibration frequency of 1 radian/second of not more than $5 \times 10^4$ poise, and a Newtonian viscosity index n calculated by the following formula:

$$n = (\log \eta^*(1) - \log \eta^*(100))/2$$

using η*(1) and a complex dynamic viscosity η*(100) measured at 250° C. under vibration frequency of 100 radian/second of not more than 0.28.

2. The thermoplastic elastomer composition powder according to claim 1, wherein the conjugated diene of the hydrogenated conjugated diene polymer or the hydrogenated conjugated diene copolymer having a hydrogenation degree of not less, than 70%, which is prepared by hydrogenating a conjugated diene-vinyl aromatic compound random copolymer in which the content of a vinyl aromatic compound unit is not more than 25% by weight, is butadiene or isoprene and the vinyl aromatic compound is styrene, p-methylstyrene or α-methylstyrene.

3. The thermoplastic elastomer composition powder according to claim 1, wherein the ethylene/α-olefin copolymer rubber is an ethylene/α-olefin/non-conjugated diene copolymer rubber.

4. The thermoplastic elastomer composition powder according to claim 3, wherein the ethylene/α-olefin copolymer rubber is an ethylene-propylene-5-ethylidene-2-norbornene copolymer rubber.

5. The thermoplastic elastomer composition powder according to claim 1, wherein at least one of the polyolefin resin (a); the hydrogenated conjugated diene polymer or the hydrogenated conjugated diene copolymer having a hydrogenation degree of not less than 70%, which is prepared by hydrogenating a conjugated diene-vinyl aromatic compound random copolymer in which the content of a vinyl aromatic compound unit is not more than 25% by weight (b); or the ethylene/α-olefin copolymer rubber (c) is dynamically crosslinked.

* * * * *